United States Patent
Ouzan et al.

(10) Patent No.: US 10,853,058 B1
(45) Date of Patent: Dec. 1, 2020

(54) APPLICATION SIMILARITY DETECTION

(71) Applicant: Nyotron (USA), Inc., Santa Clara, CA (US)

(72) Inventors: Freddy Ouzan, Ashdod (IL); Tom Gonda, Nahariya (IL); Eran Bida, Givatayim (IL); Lior Moalem, Gedera (IL); Shachar Schidorsky, Givatayim (IL); Rene Kolga, Santa Clara, CA (US)

(73) Assignee: Nyotron (USA), Inc., Santa Clara, CA (US)

( * ) Notice: Subject to any disclaimer, the term of this patent is extended or adjusted under 35 U.S.C. 154(b) by 0 days.

(21) Appl. No.: 16/370,453

(22) Filed: Mar. 29, 2019

Related U.S. Application Data (60) Provisional application No. 62/650,997, filed on Mar. 30, 2018.

(51) Int. Cl.
*G06F 9/44* (2018.01)
*G06F 8/71* (2018.01)
*G06F 21/57* (2013.01)
*H04L 9/32* (2006.01)

(52) U.S. Cl.
CPC ............... *G06F 8/71* (2013.01); *G06F 21/57* (2013.01); *H04L 9/3239* (2013.01); *G06F 2221/033* (2013.01)

(58) Field of Classification Search
CPC ........ G06F 21/64; G06F 8/71; G06F 21/6209; G06F 21/6263; G06F 16/951; H04L 41/082
See application file for complete search history.

(56) References Cited

U.S. PATENT DOCUMENTS

| | | | | |
|---|---|---|---|---|
| 8,266,115 | B1* | 9/2012 | Park | G06F 16/951 707/692 |
| 2005/0172124 | A1* | 8/2005 | Carpentier | G06F 21/64 713/165 |
| 2013/0298117 | A1* | 11/2013 | Reynolds | H04L 41/082 717/173 |
| 2014/0258730 | A1* | 9/2014 | Stecher | G06F 21/6209 713/189 |
| 2018/0150487 | A1* | 5/2018 | Olivier | G06F 8/71 |
| 2019/0109848 | A1* | 4/2019 | Clark | G06F 21/6263 |

* cited by examiner

*Primary Examiner* — Tuan A Vu
(74) *Attorney, Agent, or Firm* — Van Pelt, Yi & James LLP (57) ABSTRACT

A method of determining whether a program corresponds to a new version of an application is disclosed. A key value corresponding to the program is determined. A program descriptor corresponding to the program is determined. The program descriptor comprises fields extracted from a program file associated with the program. One or more versions of an application having the same key value are identified. A program descriptor corresponding to each of the one or more versions of the application is identified. The program descriptor corresponding to each of the one or more versions of the application comprises fields extracted from a program file associated with the version of the application. The determination of whether the program corresponds to a new version of the identified application is based on comparing the program descriptor corresponding to the program against the program descriptors corresponding to the one or more versions of the identified application.

21 Claims, 7 Drawing Sheets

| | Data Item from File | Example for Value |
|---|---|---|
| 1 | MD5 or Another Hash Type | 7b502c3a1f48c8609a.... |
| 2 | Product Name | SampleApp |
| 3 | Company Name | ACME Corp |
| 4 | Architecture | 32 or 64 bit |
| 5 | Original File Name | SampleApp.exe |
| ... | ... | ... |

Fig. 1

| ID | Product Name | Company Name | ... |
|---|---|---|---|
| 1 | SampleApp | ACME Corp | |
| ... | ... | ... | |

APPLICATION SIMILARITY DETECTION

CROSS REFERENCE TO OTHER APPLICATIONS

This application claims priority to U.S. Provisional Patent Application No. 62/650,997 entitled APPLICATION SIMILARITY DETECTION filed Mar. 30, 2018 which is incorporated herein by reference for all purposes.

BACKGROUND OF THE INVENTION

Different techniques have been used to prevent the execution of undesirable programs. One approach is application blacklisting; for example, antivirus programs, intrusion detection systems, or spam filters may use blacklisting to filter out data that may contain security threats or inappropriate content. An example for blacklisting would be maintaining a list of applications that are to be denied system access and that are prevented from being installed or executed on a system. Another approach is application whitelisting. An example for whitelisting can be a simple list of authorized applications. When an application tries to execute, the application is automatically checked against the list. If it is not on the list, the application is not permitted to run.

System hardening is the process of securing a system by reducing its surface of vulnerability, which is larger when a system performs more functions. Reducing available ways of attack typically includes changing default passwords, removing unnecessary software, unnecessary usernames or logins, and disabling or removing unnecessary services.

Application blacklisting, application whitelisting, or system hardening all need some means of identifying applications from one another. A file hash may be used to identify an application. For example, the MD5 message-digest algorithm or the Secure Hash Algorithm (e.g., SHA-256, which is a hash function with digests that are 256 bits long) may be used. The downside of a hash-based technique is that a file hash changes after each modification of the file. For example, when a newer version of application A 1.1.1 becomes available (e.g., application A 1.1.2 or A 1.1.1 service pack 1), the hash changes even when the newer version has only minor changes in comparison with its previous version. Typically, this type of whitelist/blacklist maintenance is performed manually and is not scalable. Alternatively, broader identification/classification variables, such as metadata properties that are part of the file, may be used. For example, the product name and/or the company/manufacturer name could be used. However, they are not tamper proof. For example, the header of the Portable Executable (PE) or Executable and Linkable Format (ELF) that includes the identification variables may be modified.

Therefore, improved techniques of tracking/detecting different versions of the same application are desirable. It is beneficial to include a whitelist policy (an ALLOW policy) that will still allow an application to run even after its product version has been updated. It is also beneficial to be able to define a blacklist policy (a DENY policy) that prevents newer/older versions of an application from running within an organization.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the present application, techniques to compare programs and determine if they are similar are disclosed. The technique checks the metadata of the program files and the data within the program files and determines whether the files are similar enough such that the system can relate to them as different versions of the same application. If the application is determined as being safe to run on a system, the different versions of the application are also determined as being safe to run on the system. In some embodiments, the technique checks at least some of the metadata and some of the data within the sections of a file such as the Portable Executable (PE) format and determines whether the files are similar enough such that the system can relate to them as different versions of the same application. The PE format is provided as an illustrative example only, and therefore should not be viewed as limiting. One of skilled in the art should realize that other formats may be used as well.

A method of determining whether a program corresponds to a new version of an application is disclosed. A key value corresponding to the program is determined. A program descriptor corresponding to the program is determined, wherein the program descriptor comprises fields extracted from a program file associated with the program. One or more versions of an application having the same key value are identified. A program descriptor corresponding to each of the one or more versions of the application is identified. The program descriptor corresponding to each of the one or more versions of the application comprises fields extracted from a program file associated with the version of the application. The determination of whether the program corresponds to a new version of the identified application is based at least in part on comparing the program descriptor corresponding to the program against the program descriptors corresponding to the one or more versions of the identified application.

A data structure may be used to store a plurality of fields for comparing programs. The data structure is herein referred to as a program descriptor (or Descriptor). For example, the data structure for storing a plurality of fields for comparing files with the PE file format is referred to as the PE File Data Descriptor. The PE format is a file format for executables, object code, dynamic-link libraries (DLLs), and font files (e.g., FON files) that are used in 32-bit and 64-bit versions of Windows operating systems. The PE format has a data structure that encapsulates the information necessary for the Windows OS loader to manage the wrapped executable code. Similar structures exist for different operating systems. For instance, Unix and Unix-like systems use the Executable and Linkable Format (ELF) file format, and various Mac based operating systems use the Mach object (Mach-0) file format.

Figure 1:
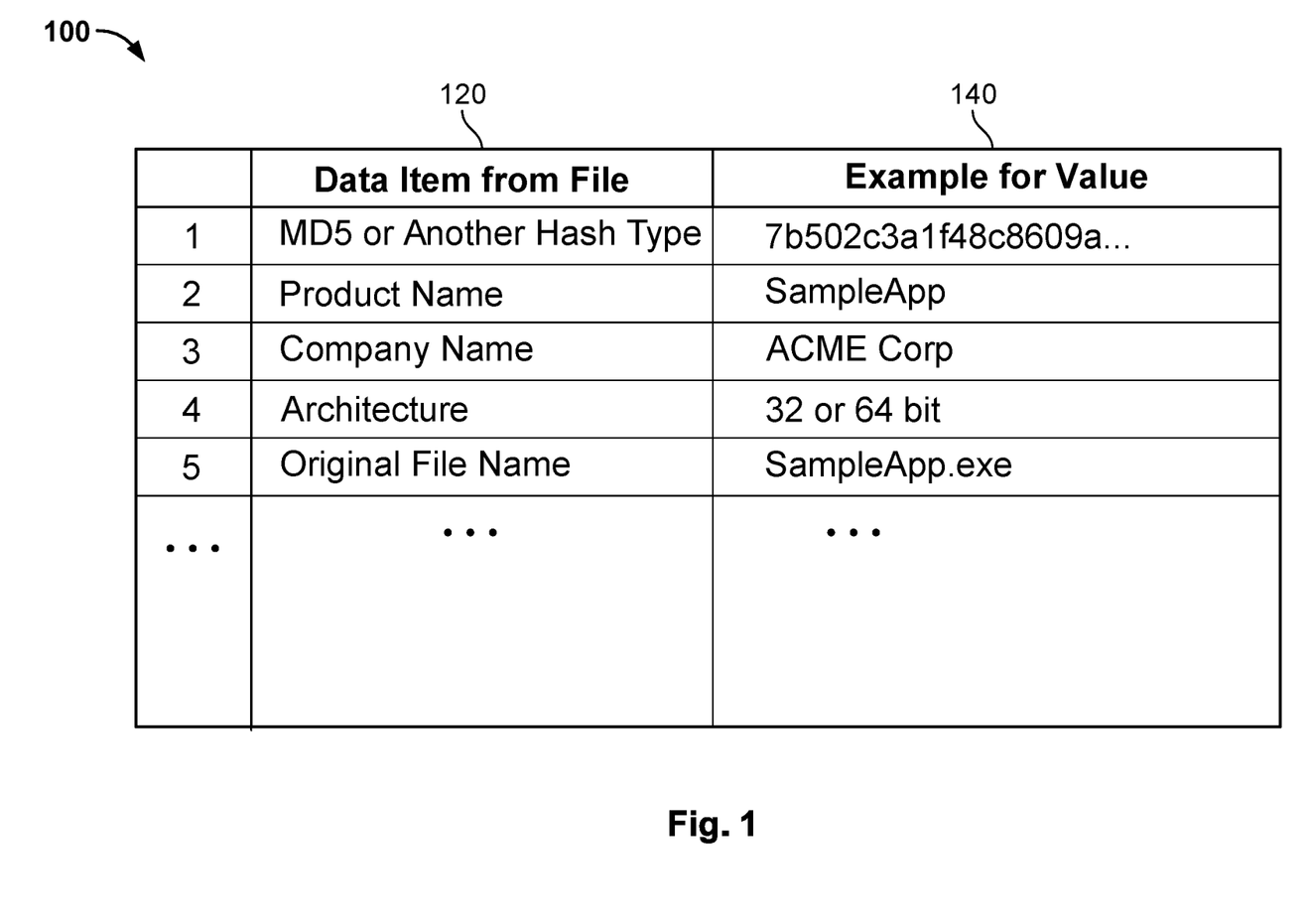
FIG. 1 shows an example of a table 100 that lists a plurality of fields that may be generated for an executable file for comparing files.

FIG. 1 shows an example of a table 100 that lists a plurality of fields that may be generated for an executable file for comparing files. For example, the executable file may be a PE File, and the PE File Data Descriptor may be used for comparing files. The fields of the PE file Data Descriptor are shown in the left column 120 of table 100. They are fields that are extracted from a file in the PE file format. Example values for the corresponding fields are shown in the right column 140 of table 100. Field 1 is a file hash, such as a file hash based on the MD5 message-digest algorithm or the Secure Hash Algorithm. Field 2 is the product name. For example, the product name may be SampleApp. Field 3 is the company name. For example, the company name may be ACMF Corp. Field 4 is the computer architecture. For example, the computer architecture may be 32-bit or 64-bit. Field 5 is the original file name. For example, the original file name may be SampleApp.exe. Additional information may be stored in the Descriptor, including information about the file sections. The method of data extraction may be dynamic, i.e., it may differ between files types and be dependent on its data. Some of the data is extracted as is (such as the PE Header fields), and some of the data may be computed (such as the hash of the file or its Sections). A data structure (e.g., a table) may be used to hold the key values that identify all the known applications. This table is referred to as the Application Keys Table (or ApplicationKeys). In some embodiments, the key value that identifies an application is a combination of the application's product name and the application's company name, which are two of the fields in the Descriptor of the application. In these embodiments, the Application Keys Table is used to hold all the product name and company name pair values of the known applications.

Figure 2:
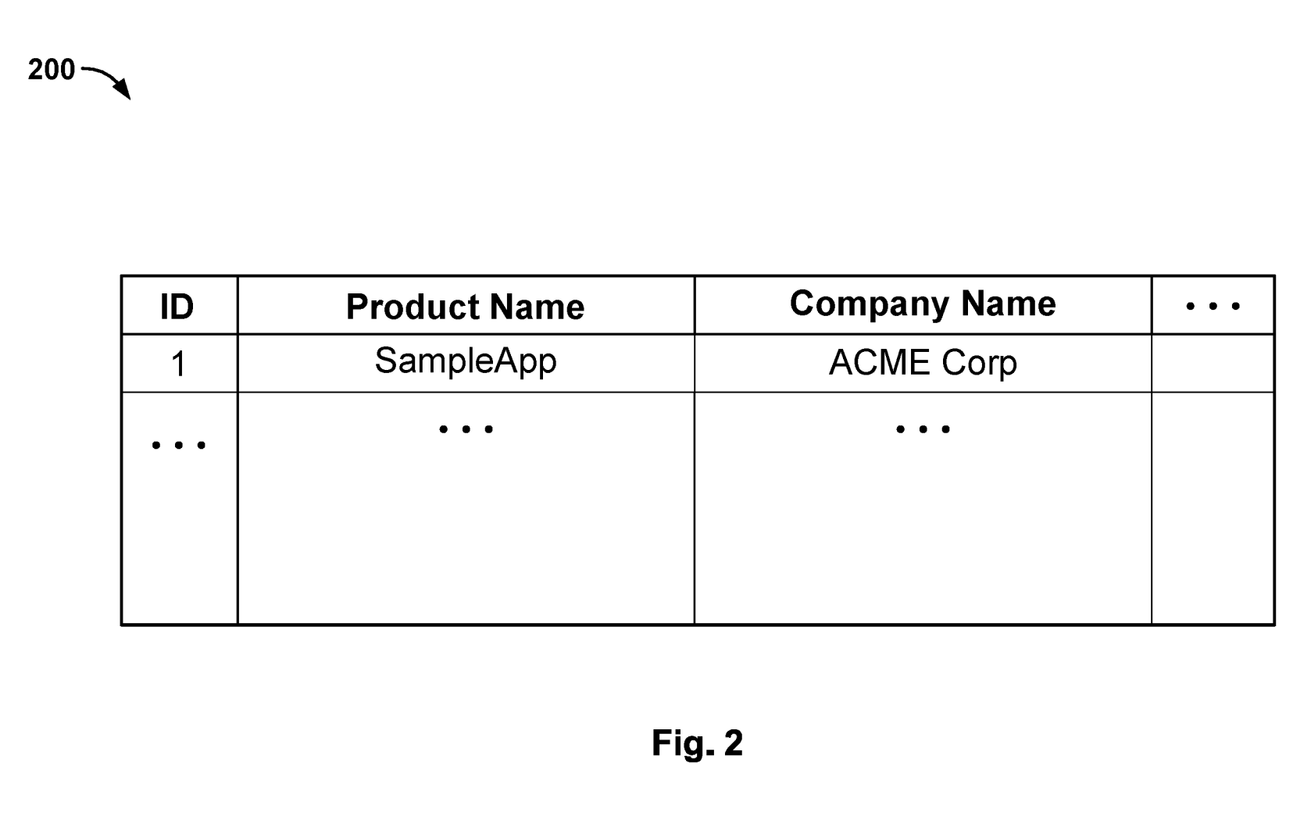
FIG. 2 shows an example of an Application Keys Table 200.

FIG. 2 shows an example of an Application Keys Table 200. As shown in FIG. 2, the Application Keys Table 200 has a plurality of entries, and each entry has an identification (Id) in the table. The first entry of the Application Keys Table 200 corresponds to the application SampleApp. The entry has an Id of 1 in the table, and the key value is the product name SampleApp combined with the company name "ACME Corp."

A data structure (e.g., a table) may be used to hold the Descriptors for various versions of all the known applications from the Application Keys Table. This table is referred to as the Application Descriptors Table (or ApplicationDescriptors). The ApplicationData comprises the mappings between the applications to the Descriptors corresponding to those applications. In particular, a key value (e.g., the product name combined with the company name and possibly concatenated with additional fields) from the Application Keys Table may be mapped to multiple Descriptors, with each Descriptor corresponding to a different version of the application.

Figure 3:
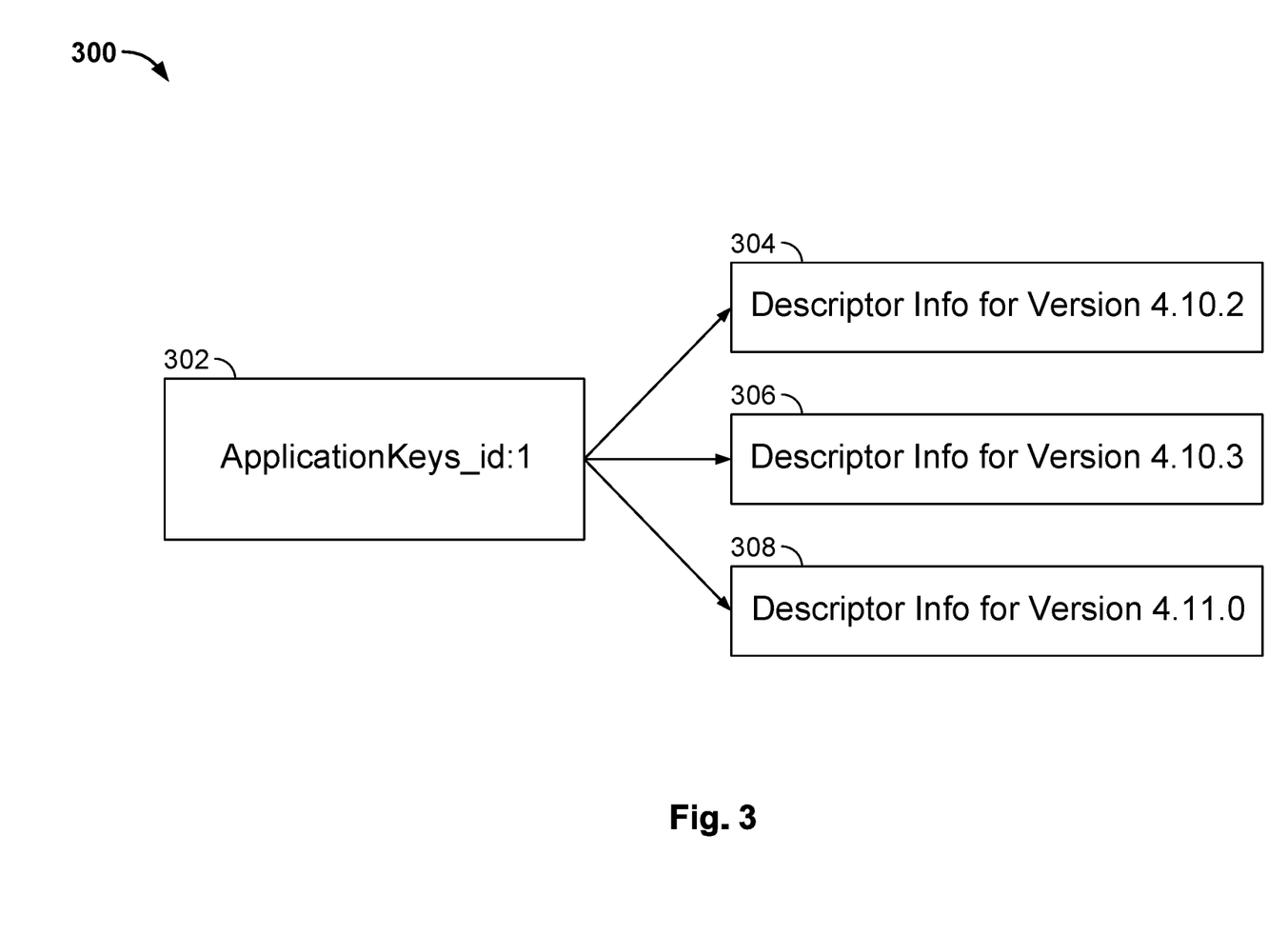
FIG. 3 shows an example mapping between the application SampleApp to the Descriptors corresponding to SampleApp in the Application Descriptors Table.

FIG. 3 shows an example mapping 300 between the application SampleApp to the Descriptors corresponding to SampleApp in the Application Descriptors Table. The figure illustrates the entry of the application SampleApp in the ApplicationKeys and Application Descriptors Tables. In some embodiments, the entry in ApplicationKeys is added with the application's product name and the application's company name values, which are SampleApp and ACME Corp, respectively. The Id for SampleApp in the Application Descriptors Table is 1. In this ApplicationKeys entry 302 for SampleApp, there are multiple corresponding entries in the Application Descriptors Table, one for each version of the application versio—4.10.2 (304), version 4.10.3 (306), and version 4.11.0 (308). In some embodiments, each Descriptor is the PE File data Descriptor described above.

An application may have multiple files, including dynamic-link libraries (DLLs), executable files (EXEs), configuration files, and the like. In some embodiments, the Descriptor of an application may be generated from the main executable file of the application (e.g., SampleApp.EXE). In other embodiments, the Descriptor of an application may be generated from a combination of files (e.g., from multiple EXE and DLL files), or for different file types (e.g., for DLL files).

Figure 4:
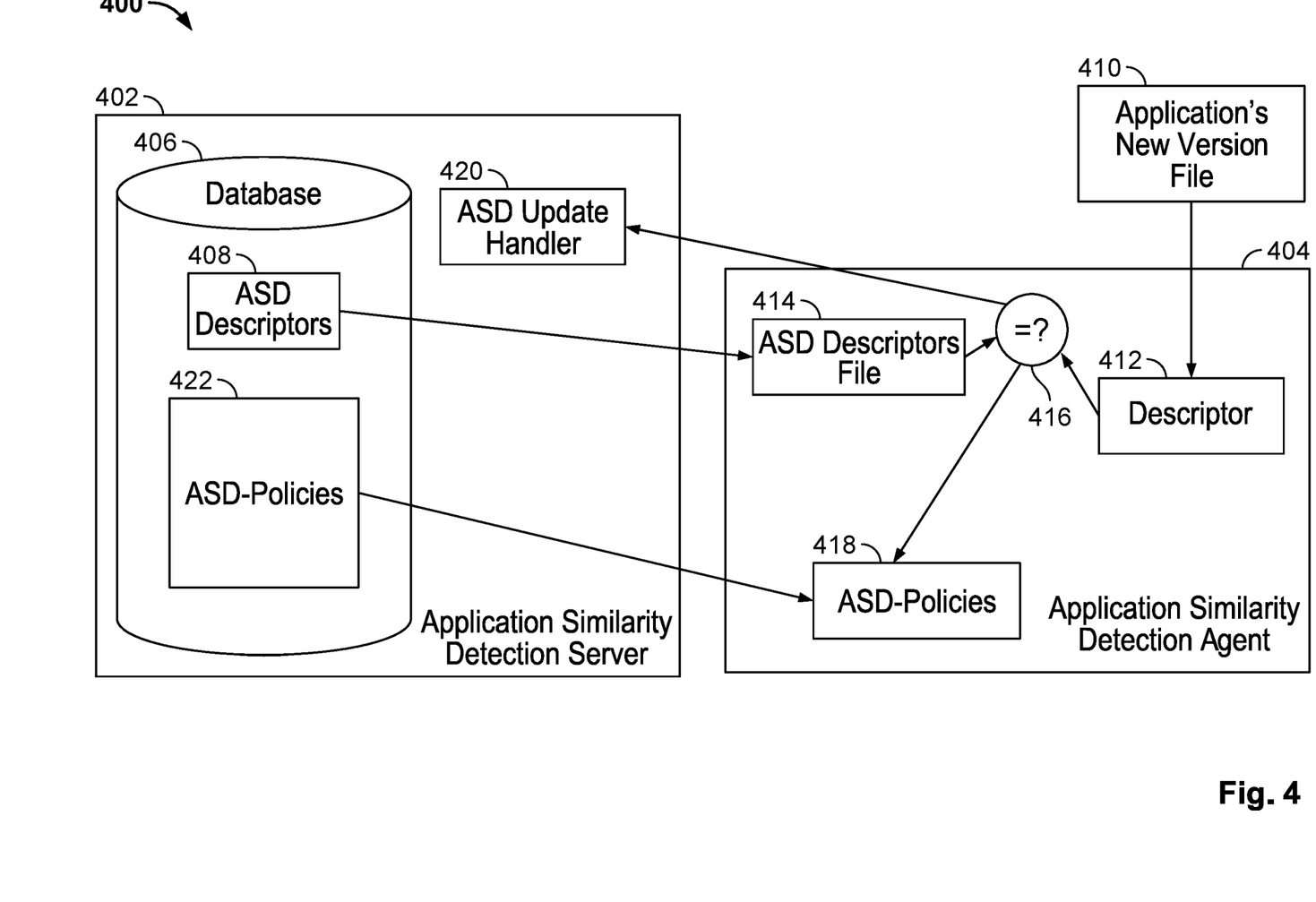
FIG. 4 illustrates an exemplary embodiment of an application similarity detection system 400.

FIG. 4 illustrates an exemplary embodiment of an application similarity detection system 400. Application similarity detection (ASD) system 400 may be implemented as a client-server system including an ASD server 402 and a plurality of ASD agents 404 (only one ASD agent is shown in FIG. 4). In other embodiments, instead of the ASD Server, an ASD module on the Agent may be used to update the ASD database or file. The module may update the entire ASD database or file, or any subset of it. ASD agent 404 may be connected to ASD server 402 through a network. The network may be any combination of public or private networks, including intranets, local area networks (LANs), wide area networks (WANs), radio access networks (RANs), Wi-Fi networks, the Internet, and the like. ASD agent 404 may run on different types of endpoint devices, including laptop computers, desktop computers, tablet computers, smartphones, and other mobile devices.

ASD server 402 includes a database 406. Database 406 may be used to store the ApplicationData, such as the ApplicationKeys and ApplicationDescriptors as described above. In some embodiments, each Descriptor forms a row in Application Descriptors Table 408. One column of the Application Descriptors Table 408 in database 406 has the corresponding Id in the Application Keys Table. Other columns of Application Descriptors Table 408 may store the fields of the Descriptor, such as the fields listed in column 120 of table 100. In addition, one column of Application Descriptors Table 408 may store a timestamp field representing the time the row (i.e., the Descriptor) was added to the table. The timestamp value of the last updated entry in the Application Descriptors Table 408 (i.e., the timestamp of the latest row that was added to the Application Descriptors Table 408 in database 406) is referred to as the Application Descriptors table timestamp.

ASD agent 404 may also store a local copy of the ApplicationData, including ApplicationKeys and ApplicationDescriptors. In some embodiments, ASD agent 404 may update its ApplicationData in near-real-time. For example, ASD agent 404 may request ASD server 402 to provide the latest ApplicationData when ASD agent 404 boots up and starts running. ASD agent 404 may also request ASD server 402 to provide the most updated ApplicationData on a regular basis, e.g., periodically.

In some embodiments, when ASD agent 404 performs an ApplicationData update operation, it queries ASD server 402 by providing the server the timestamp of the agent's local copy of the Application Descriptors Table, which is the timestamp corresponding to the latest entry added to the agent's local table. If ASD server 402 has a newer version of the ApplicationData tables, ASD server 402 may send to the agent any subset of the updated data. If the agent's Application Descriptors table timestamp is the same as the server's Application Descriptors table timestamp, then ASD server 402 does not need to send the ApplicationData tables to ASD agent 404.

When a new application 410 is executed in ASD agent 404, ASD agent 404 generates a Descriptor 412 for that application. The Descriptor 412 is compared using application similarity detection technique 416 against known Descriptors in ASD Descriptors File 414. In some embodiments, there could be multiple descriptors files (e.g., one for the whitelist and another for the blacklist). If a match is found, the local ASD-Policies 418 are updated (ASD-Policies are application policies related to ASD that are first generated in the server, and then passed to agents for enforcement), and an update is sent to the ASD server 402. ASD Update Handler 420 receives the update at ASD server 402 side, and updates the Database 406 with the new Descriptor found. ASD Descriptors 408 in the Database are updated. In addition, ASD-Policies 422 are updated. When ASD agents 404 periodically check for updates by querying ASD Server 402, they may get updates of ASD Descriptors and ASD-Policies.

Figure 5:
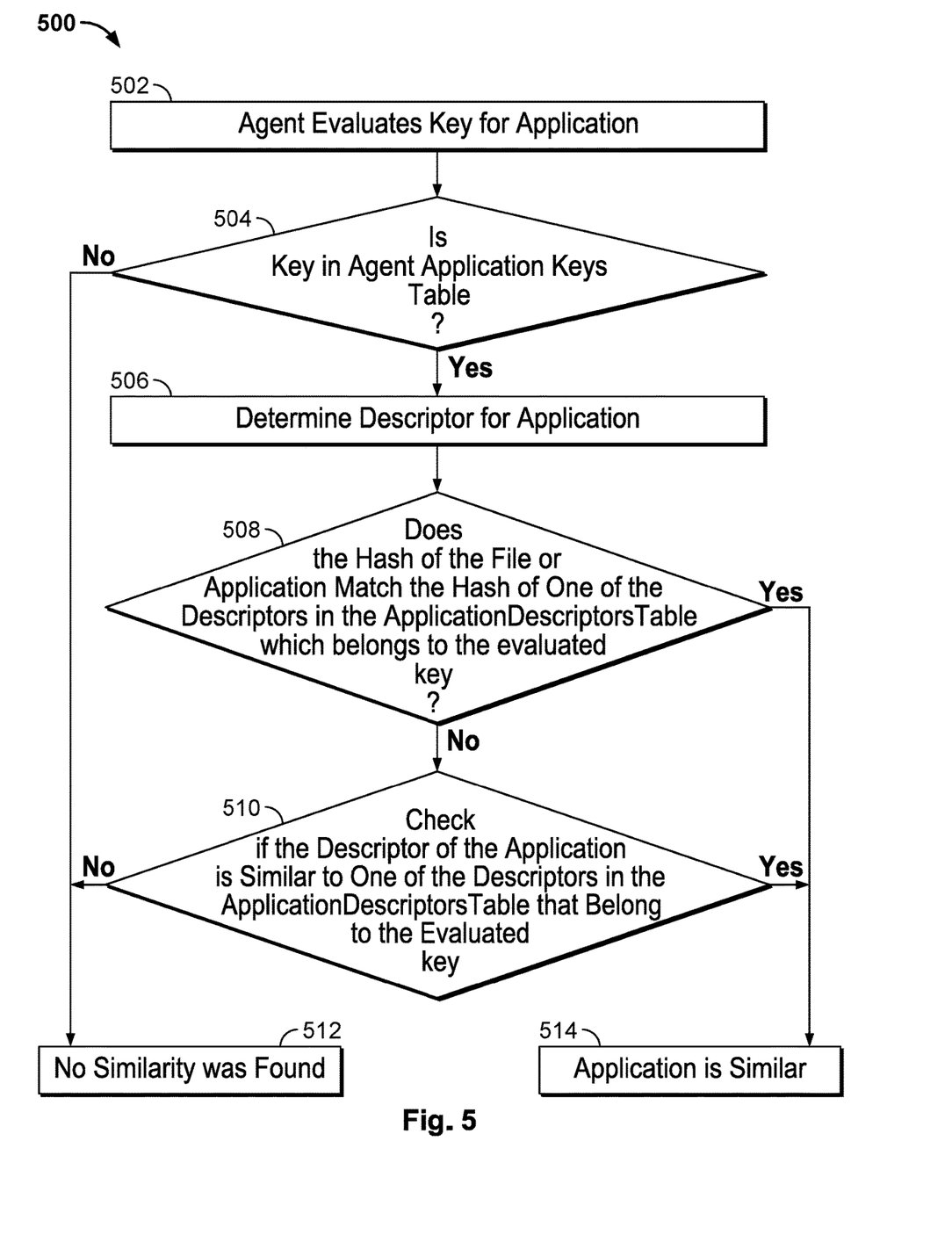
FIG. 5 illustrates an exemplary embodiment of a process 500 for determining whether an application is permitted to run or be installed on a device based on whether the application is determined by an application similarity detection technique as being similar to another application that has been approved to run or be installed on the device.

FIG. 5 illustrates an exemplary embodiment of a process 500 for determining whether an application is permitted to run or be installed on a device based on whether the application is determined by an application similarity detection technique as being similar to another application that has been approved to run or be installed on the device. For example, the approved application may be an application on an application whitelist for the device, and each of the applications on the whitelist is stored in the Application Keys and Application Descriptors Tables. In some embodiments, process 500 is performed by application similarity detection system 400.

In some embodiments, process 500 may be used in conjunction with other security products. For example, process 500 may be used on top of any antivirus software to provide false positive detection and handling. A false positive occurs when a benign program/software is wrongfully flagged as malicious by an antivirus software. For example, when an updated newer version of a legitimate software application is falsely detected by the anti-virus software as a malware, process 500 may be used to determine that the software is safe and legitimate.

At 502, ASD agent 404 identifies an application that is about to run or be installed on the device. ASD agent 404 identifies the application by determining a key value corresponding to the application. In some embodiments, ASD agent 404 evaluates the product name and the company name of the application as the key value by extracting the product name and the company name from the executable file corresponding to the application. For example, the product name and the company name are extracted from the PE header of the executable file or the note section of an ELF file.

In some embodiments, if either the product name or company name is extracted but not both, then a key may be created using one of the names. However, if neither a product name nor a company name is extracted, then a key value corresponding to the application cannot be created and the Application Keys Table cannot be updated. Accordingly, a log message may be logged by ASD agent 404. In other embodiments where other fields are used as Application Keys, similar steps may be taken.

At 504, ASD agent 404 determines if the extracted key corresponding to the application is found in the agent's local Application Keys Table. If the extracted key corresponding to the application is not found, then process 500 proceeds to step 512 and it is determined that no similarity was found. Other logic in the agent may determine whether the application is approved or not to run or to be installed on the device. If the extracted key corresponding to the application matches with one of the keys in the agent's local Application Keys Table, then process 500 proceeds to step 506.

At 506, ASD agent 404 determines the Descriptor data corresponding to the application. For example, the Descriptor data may be a PE File Data Descriptor as described above. The fields of the PE File Data Descriptor include fields that are extracted or calculated from the file of the application.

At 508, ASD agent 404 determines whether the Descriptor of the application is an exact match to one of the Descriptors in the Application Descriptors Table sharing the same key value. In some embodiments, a hash of the application's executable file is compared against the executable file hash of each of the Descriptors in the Application Descriptors Table sharing the same key value. For example, the hash may be a hash generated by the MD5 message-digest algorithm or the Secure Hash Algorithm. In the event that there is an exact match, process 500 proceeds to step 514. At 514, the application being tested is determined as being similar to a previously known application by ASD agent 404. Other logic in ASD agent 404 may determine based on the similarity detection whether the application is safe to run or be installed on the device. The matching Descriptor is returned to ASD agent 404. In the event that there is not an exact match, process 500 proceeds to step 510.

At 510, ASD agent 404 determines whether the Descriptor of the application is similar to one of the Descriptors in the Application Descriptors Table sharing the same key value based on a Descriptors similarity check. The determined Descriptor data may be compared against all the Descriptors that correspond to the key that was found in the Application Keys Table. For example, suppose that the key value is the product name SampleApp combined with the company name "ACME Corp," then the Descriptor may be compared against the three Descriptors 304, 306, 308 corresponding to the same key value in the agent's local Application Descriptors Table next. The three Descriptors correspond to different versions of the SampleApp application version 4.10.2 (304), version 4.10.3 (306), and version 4.11.0 (308).

If the given Descriptor is not similar to one of the key's Descriptors based on the Descriptors similarity check, then process 500 proceeds to step 512 and it is determined that no application similarity was found.

If the given Descriptor is similar to one of the key's Descriptors based on the Descriptors similarity check, then the similar Descriptor in the Application Descriptors Table is returned. In addition, the local Application Descriptors Table is updated by adding the Descriptor of the application as a new row of the Application Descriptors Table, since a new version of the application has been detected. The local ASD-Policies 418 may also be updated. ASD agent 404 notifies ASD server 402 of the newly detected version of the application. ASD agent 404 may send to ASD server 402 the Descriptor of the application and the key associated with the Descriptor, such that the server's Application Descriptors Table may be updated accordingly. Process 500 then proceeds to step 514. At 514, the application being tested is determined to be similar to a previously known application by ASD agent 404.

Figure 6:
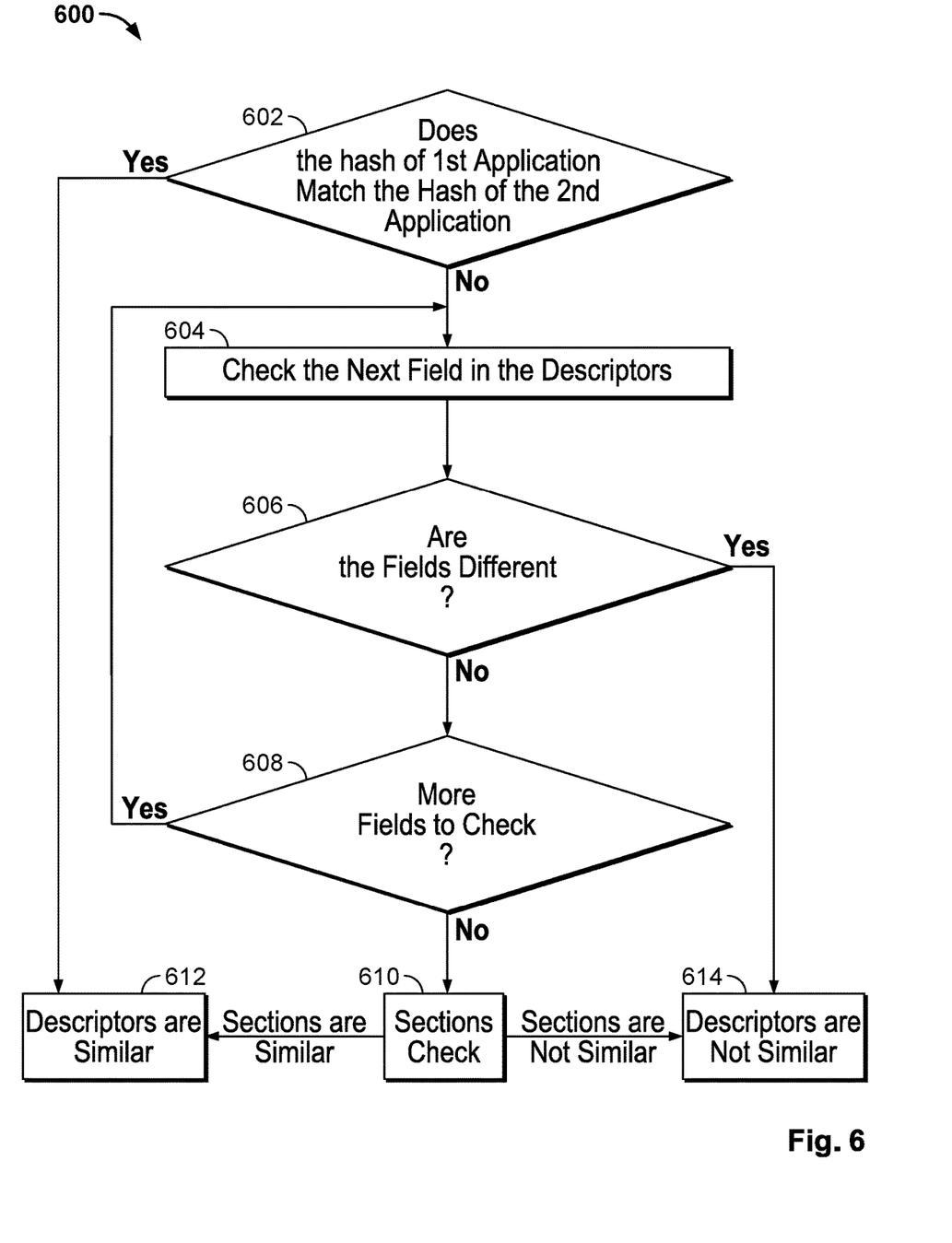
FIG. 6 illustrates an exemplary embodiment of a process 600 for determining whether an application is similar to another application.

FIG. 6 illustrates an exemplary embodiment of a process 600 for determining whether an application is similar to another application. Process 600 determines whether two files are similar enough such that the system can relate to them as different versions of the same application. Process 600 may be performed at step 510 of process 500 described above for the purpose of application whitelisting.

At 602, a hash of the Descriptor associated with the file being tested is compared against the hash of the reference Descriptor. For example, the hash may be a hash of the fields of the respective Descriptor generated by the MD5 message-digest algorithm or the Secure Hash Algorithm. In the event that there is an exact match of the two hashes, process 600 proceeds to step 612. At 612, the Descriptor being tested is determined as being similar to the reference Descriptor. In the event that there is not an exact match, process 600 proceeds to step 604.

At 604, the next field in the Descriptor being tested is compared against the next field in the reference Descriptor. At 606, if the field in the Descriptor being tested is different from the field in the reference Descriptor, then process 600 proceeds to step 614. At 614, the Descriptor being tested is determined as being not similar to the reference Descriptor. If the field in the Descriptor being tested is the same as the field in the reference Descriptor, then process 600 proceeds to step 608. At 608, it is determined whether there are additional fields in the Descriptor to check. If there are more fields to check, then process 600 proceeds to step 604, such that the next field may be checked. For example, for a PE file data descriptor, the fields that are checked one after the other may include the architecture, the original file name, etc. These fields may vary for other file types. If after all the above fields in the Descriptor have been checked and all the fields of the Descriptors are still the same, then process 600 proceeds to step 610, such that file sections check 610 (which will be described in greater detail below) may be performed. It should be recognized that the process described above may be generalized or implemented differently. At 604, 606 and 608, some other embodiments may make other decisions on which fields to check from the Descriptors and how to check (e.g., checking if parts of the Descriptors are similar to the reference file, or performing machine learning on similarity thresholds).

Some of the fields that are checked for similarity could be based on various computations done over parts of the file. For instance, sections check 610 may be performed by comparing the number of sections in the Descriptors or comparing the names and order of the sections. Also, some embodiments may compare content similarity of the sections. One metric for comparing content similarity of each section is the entropy of each of the sections. In this example, the entropy of each section is measured for content similarity comparisons. Other content similarity metrics may include ssdeep, sdhash, minhash, and the like. Additional methods may include hash functions or locality sensitive hashing functions for comparing various sections of the file.

In some embodiments, the techniques disclosed in the present application may be used in conjunction with an operating system centric (OS-centric) positive security system. One system is further described in U.S. patent application Ser. No. 12/983,897 entitled SYSTEM AND METHOD FOR REACTING TO SYSTEM CALLS MADE TO A KERNEL OF THE SYSTEM filed Jan. 4, 2011 which is incorporated herein by reference for all purposes. Another system is further described in U.S. patent application Ser. No. 12/910,881 entitled SYSTEM, A METHOD, AND A DATA-STRUCTURE FOR PROCESSING SYSTEM CALLS IN A COMPUTERIZED SYSTEM THAT IMPLEMENTS A KERNEL filed Oct. 25, 2010 which is incorporated herein by reference for all purposes. Another system is further described in U.S. patent application Ser. No. 12/910,880 entitled SYSTEM AND A METHOD FOR PROCESSING SYSTEM CALLS IN A COMPUTERIZED SYSTEM THAT IMPLEMENTS A KERNEL filed Oct. 25, 2010 which is incorporated herein by reference for all purposes.

For example, a graphical user interface (GUI) may be provided for the system administrator to create a policy based on the OS-centric positive security system. When the system administrator/user creates an exception policy for a detected software, all the related software (e.g., previous or updated versions that are similar to the software) may be handled by the same exception policy automatically and efficiently.

In some embodiments, the system includes a whitelist policy (an allow policy) that will allow an application to perform actions even after its product version has been updated. In some embodiments, the ASD functionalities are exposed in the exceptions tab that allows the system administrator to manage the exceptions of the allow policy. The exceptions tab may include two sub-menus—the ApplicationKeys sub-menu and the ApplicationDescriptors menu.

In the ApplicationKeys sub-menu, the user may view the list of ApplicationKeys and edit the policy properties associated with the ApplicationKeys. For example, the user may set the property of an application associated with an ApplicationKey to Allow/Deny, depending on whether the user decides to approve or deny the running of the application. The user may also delete an ApplicationKey, which will cause all of the Descriptors corresponding to the ApplicationKey to be deleted as well.

In the ApplicationDescriptors sub-menu, the user may add a new ApplicationDescriptor by selecting or dragging-and-dropping a file. After the file selection, the GUI may approve the addition and display the associated ApplicationKey and Descriptor values. In addition, the file is added to the Application Descriptors Table in the database, and if the associated ApplicationKey is new, a new ApplicationKey entry is added to the Application Key Table as well. The GUI may also disallow the addition, for example because the system fails to extract the relevant application keys (such as company name and product name in the case of a PE File Data Descriptor), which are required for creating an associated ApplicationKey for the ApplicationDescriptor. The user may also delete a particular ApplicationDescriptor from the sub-menu.

In some embodiments, clicking on an ApplicationDescriptor will show its details. For example, a portion or all of the field values of the ApplicationDescriptor may be shown.

In some embodiments, at the top of the ApplicationDescriptors window, a bar may be used to indicate the number of unmatched ApplicationDescriptors. In addition, links to the ApplicationKeys that have unmatched Descriptors may be displayed. Selecting one of these links will lead to the Descriptors list view presenting unmatched Descriptors for the ApplicationKey. An unmatched Descriptor is a descriptor of a new application that was executed on the agent, and the system did not find a similar known Descriptor for it.

In some embodiments, a user may select a particular ApplicationKey to view a list of ApplicationDescriptors associated with the ApplicationKey. In addition, a filter of ApplicationKeys using auto-complete selection may be provided. A filter for matched/unmatched Descriptors (e.g., as radio buttons) may be provided.

In some embodiments, a Descriptor comparison feature may be provided. For example, the user may select two Descriptors and then click on a Compare button, and the GUI will show a comparison of their fields side-by-side.

In some embodiments, the system includes a blacklist policy (also referred to as a hardening or deny policy) that may be used to block the execution of certain applications. For example, the policy may be used to block the execution of the application Skype, a telecommunications application software product that provides video chat and voice calls via the Internet.

Figure 7:
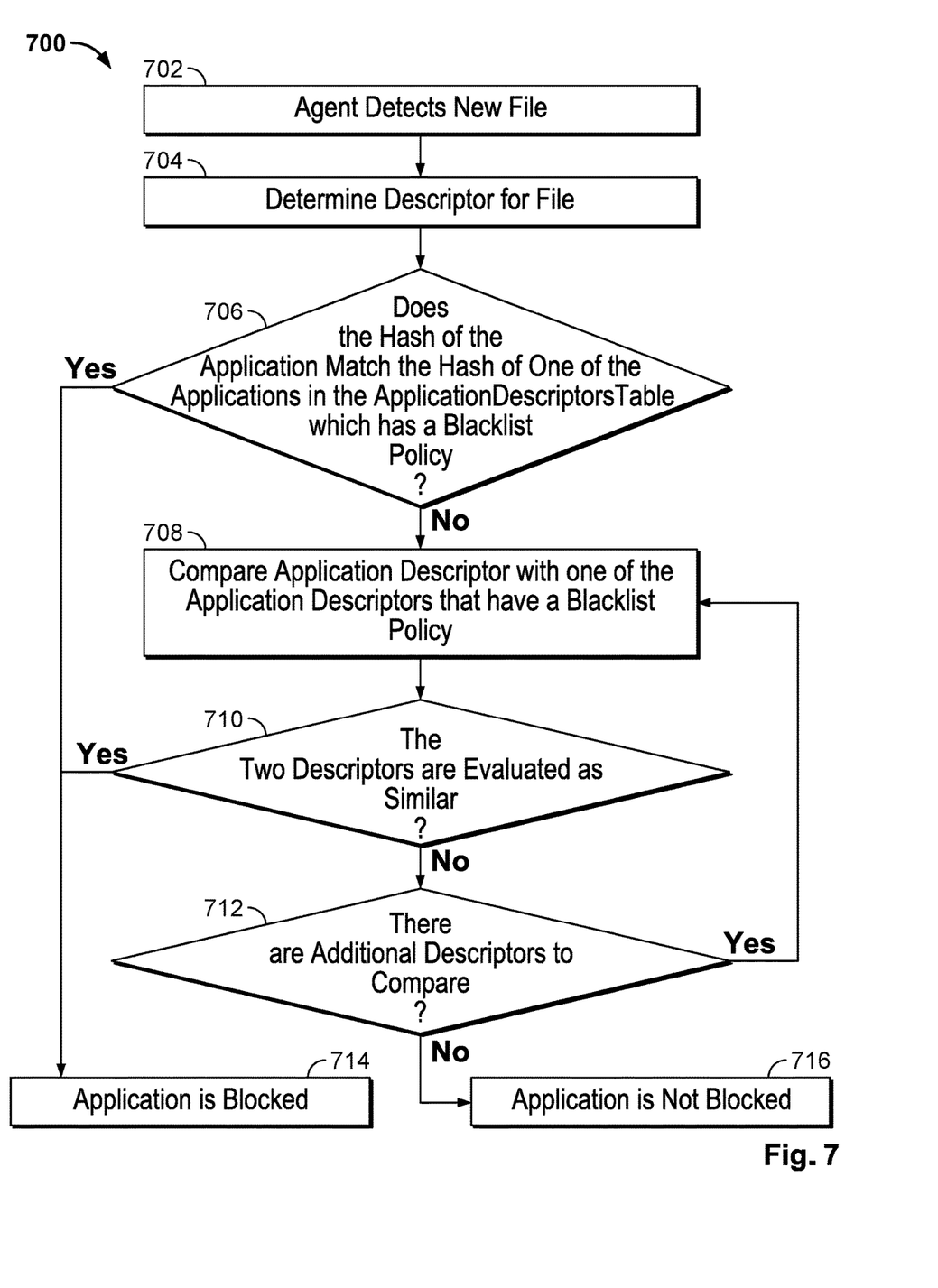
FIG. 7 illustrates an exemplary embodiment of a process 700 for determining whether an application is blocked from being executed or being installed on a device based on whether the application is determined by an application similarity detection technique as being similar to another application that has been blocked on the device.

FIG. 7 illustrates an exemplary embodiment of a process 700 for determining whether an application is blocked from being run or being installed on a device based on whether the application is determined by an application similarity detection technique as being similar to another application that has been blocked on the device.

At 702, ASD agent 404 identifies the application that is about to run or be installed on the device. Then, at 704, ASD agent 404 calculates the ASD Descriptor for the application. For example, the Descriptor data may be a PE File Data Descriptor as described above.

At 706, ASD agent 404 determines whether the Descriptor of the application is an exact match to one of the Descriptors in the ASD Descriptors file (414) that has a black-list policy. In some embodiments, a hash of the application's executable file (entirely or parts of it) is compared against the executable file hash of each of the Descriptors in the ASD Descriptors file. For example, the hash may be generated by the MD5 message-digest algorithm or the Secure Hash Algorithm. In the event that there is an exact match, process 700 proceeds to step 714, and it is determined that the application is blocked from being run or being installed on the device. The matching Descriptor is returned to ASD agent 404. In the event that there is not an exact match, process 700 proceeds to step 708.

At step 708, the descriptor of the application is compared against a descriptor from the ASD Descriptors file. The comparison may be done in multiple ways. For example, some fields in the descriptors may be compared using exact match comparison. These fields have a binary similarity result (similar, or not similar). Other fields in the descriptor may be compared using a similarity function which may return different values with respect to the tested fields. For example, a range may be used such that 0 means the compared fields are not similar, and 1 means that the compared fields are similar. In this scenario, if the two fields have a similarity score of 0.97, they are likely very similar.

The ASD agent may determine if two descriptors are similar using multiple forms of aggregations over the fields comparison results. For instance, one method may require that a certain percent of the descriptors fields similarity be above some threshold to deem two descriptors as similar. Other methods may use different approaches, such as assigning a weight to each field, and computing an overall similarity score of two descriptors.

At step 710, if the descriptor of the file is similar to a reference descriptor that has a blacklist rule, then the new file is blocked. In some embodiments, the ASD agent 404 may choose to insert the new descriptor to the ASD Descriptors file 414 and add a blacklist rule to the ASD-Policies 418. ASD agent 404 may send to ASD server 402 the Descriptor of the application and the key associated with the Descriptor, such that the server's Application Descriptors Table may be updated accordingly.

In case the result of step 710 is that the files are not similar, the ASD agent checks if the descriptor is similar to the next file in the ASD Descriptors file at 712. Some embodiments may choose different methods of selecting the order in which ASD Descriptors are compared. Additionally, many methods may be used for improving the similarity computation time such as caching results and avoiding repeating the same computation for multiple descriptors.

Once step 712 has exhausted all the descriptors in the ASD Descriptors file, the ASD agent continues execution without flagging the file as blacklisted. Some embodiments may choose to insert the descriptor of the file to the ASD Descriptors file (e.g., for caching the result).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining whether a first application corresponds to a new version of a second application, comprising:
   selecting a program file associated with the first application; and
   calculating a hash of the selected program file, and in response to determining that the hash of the selected program file does not match with a plurality of hashes, each being a hash of a corresponding program file associated with one of a plurality of older versions of the second application:
  determining a first program descriptor corresponding to the first application, wherein the first program descriptor comprises metadata fields extracted from the selected program file associated with the first application, and wherein the first program descriptor comprises a plurality of data sections extracted from the selected program file associated with the first application; and
  determining that the first application corresponds to a new version of the second application based on a determination that the first program descriptor is similar to a second program descriptor corresponding to one of the plurality of older versions of the second application, wherein determining similarity of the two program descriptors comprises:
    determining that the metadata fields of the first program descriptor are similar to the corresponding metadata fields of the second program descriptor;
    computing a content similarity entropy metric between each data section in the first program descriptor and its corresponding data section in the second program descriptor; and
    determining that each data section in the first program descriptor is similar to its corresponding data section in the second program descriptor based on the computed content similarity entropy metrics.

2. The method of claim 1, further comprising determining a key value corresponding to the first application, wherein determining the key value corresponding to the first application further comprises:
  extracting a plurality of fields from a header of the selected program file; and
  determining the key value corresponding to the first application as a combination of the plurality of extracted fields.

3. The method of claim 1, further comprising:
  in response to determining that the hash of the selected program file matches with at least one hash of a corresponding program file associated with one of a plurality of older versions of the second application, determining that the first application corresponds to a new version of the second application.

4. The method of claim 1, wherein determining that the metadata fields of the first program descriptor are similar to the corresponding metadata fields of the second program descriptor further comprises:
  comparing the metadata fields of the first program descriptor corresponding to the first application against the corresponding metadata fields of the second program descriptor; and
  determining whether the first application is similar to the version of the second application corresponding to the second program descriptor based on the metadata field comparisons.

5. The method of claim 1, further comprising:
  determining the second program descriptor corresponding to each of the one or more one of the plurality of older versions of the second application, wherein the second program descriptor comprises metadata fields extracted from a selected program file associated with the second application, and wherein the second program descriptor comprises a plurality of data sections extracted from the selected program file associated with the second application;
  storing the second program descriptor corresponding to one of the plurality of older versions of the second application in a database;
  determining a key value corresponding to the first application; and
  identifying the second application and the second program descriptor based on the key value.

6. The method of claim 1, wherein the determining of the first program descriptor corresponding to the first application further comprises:
  extracting a selected plurality of fields from the selected program file associated with the first application;
  storing the extracted selected plurality of fields as metadata fields of the first program descriptor corresponding to the first application;
  calculating one or more content entropy metrics based on the plurality of data sections extracted from the selected program file associated with the first application or more sections of the program files; and
  storing the calculated content entropy metrics as fields of the first program descriptor corresponding to the first application.

7. The method of claim 6, wherein calculating the one or more content entropy metrics based on the plurality of data sections extracted from the selected program file associated with the first application comprises:
  calculating one of the content entropy metrics based on a set of byte array data of one of the plurality of data sections extracted from the selected program file associated with the first application.

8. The method of claim 6, wherein calculating the one or more content entropy metrics based on the plurality of data sections extracted from the selected program file associated with the first application comprises:
  calculating one of the content entropy metrics based on a set of byte array data extracted from all of the plurality of data sections extracted from the selected program file associated with the first application.

9. The method of claim 6, further comprising determining the second program descriptor corresponding to one of the plurality of older versions of the second application, comprising:
  extracting a selected plurality of fields from a selected program file associated with one of the plurality of older versions of the second application;
  storing the extracted selected plurality of fields as metadata fields of the second program descriptor corresponding to one of the plurality of older versions of the second application;
  calculating one or more content entropy metrics based on a plurality of data sections extracted from the selected program file associated with one of the plurality of older versions of the second application; and
  storing the calculated content entropy metrics as fields of the second program descriptor corresponding to one of the plurality of older versions of the second application.

10. A system for determining whether a first application corresponds to a new version of a second application, comprising:
  a processor; and
  a memory coupled with the processor, wherein the memory is configured to provide the processor with instructions which when executed cause the processor to:

select a program file associated with the first application; and calculate a hash of the selected program file, and in response to determining that the hash of the selected program file does not match with a plurality of hashes, each being a hash of a corresponding program file associated with one of a plurality of older versions of the second application:

determine a first program descriptor corresponding to the first application, wherein the first program descriptor comprises metadata fields extracted from the selected program file associated with the first application, and wherein the first program descriptor comprises a plurality of data sections extracted from the selected program file associated with the first application; and determine that the first application corresponds to a new version of the second application based on a determination that the first program descriptor is similar to a second program descriptor corresponding to one of the plurality of older versions of the second application, wherein determining similarity of the two program descriptors comprises:

determining that the metadata fields of the first program descriptor are similar to the corresponding metadata fields of the second program descriptor;

computing a content similarity entropy metric between each data section in the first program descriptor and its corresponding data section in the second program descriptor; and determining that each data section in the first program descriptor is similar to its corresponding data section in the second program descriptor based on the computed content similarity entropy metrics.

11. The system of claim 10, wherein the memory is configured to provide the processor with instructions which when executed cause the processor to determine a key value corresponding to the first application, wherein determining the key value corresponding to the first application further comprises:

extracting a plurality of fields from a header of the selected program file; and determining the key value corresponding to the first application as a combination of the plurality of extracted fields.

12. The system of claim 10, wherein the memory is configured to provide the processor with instructions which when executed cause the processor to in response to determining that the hash of the selected program file matches with at least one hash of a corresponding program file associated with one of a plurality of older versions of the second application, determining that the first application corresponds to a new version of the second application.

13. The system of claim 10, wherein determining that the metadata fields of the first program descriptor are similar to the corresponding metadata fields of the second program descriptor further comprises:

comparing the metadata fields of the first program descriptor corresponding to the first application against the corresponding metadata fields of the second program descriptor; and determining whether the first application is similar to the version of the second application corresponding to the second program descriptor based on the metadata field comparisons.

14. The system of claim 10, wherein the memory is configured to provide the processor with instructions which when executed cause the processor to determine the second program descriptor corresponding to one of the plurality of older versions of the second application, wherein the second program descriptor comprises metadata fields extracted from a selected program file associated with the second application, and wherein the second program descriptor comprises a plurality of data sections extracted from the selected program file associated with the second application;

storing the second program descriptor corresponding to one of the plurality of older versions of the second application in a database;

determining a key value corresponding to the first application; and identifying the second application and the second program descriptor based on the key value.

15. The system of claim 10, wherein the determining of the first program descriptor corresponding to the first application further comprises:

extracting a selected plurality of fields from the selected program file associated with the first application;

storing the extracted selected plurality of fields as metadata fields of the first program descriptor corresponding to the first application;

calculating one or more content entropy metrics based on the plurality of data sections extracted from the selected program file associated with the first application; and storing the calculated content entropy metrics as fields of the first program descriptor corresponding to the first application.

16. The system of claim 15, wherein calculating the one or more content entropy metrics based on the plurality of data sections extracted from the selected program file associated with the first application comprises:

calculating one of the content entropy metrics based on a set of byte array data of one of the plurality of data sections extracted from the selected program file associated with the first application.

17. The system of claim 15, wherein calculating the one or more content entropy metrics based on the plurality of data sections extracted from the selected program file associated with the first application comprises:

calculating one of the content entropy metrics based on a set of byte array data extracted from all of the plurality of data sections extracted from the selected program file associated with the first application.

18. The system of claim 15, wherein the memory is configured to provide the processor with instructions which when executed cause the processor to:

extracting a selected plurality of fields from a selected program file associated with one of the plurality of older versions of the second application;

storing the extracted selected plurality of fields as metadata fields of the second program descriptor corresponding to one of the plurality of older versions of the second application;

calculating one or more content entropy metrics based on a plurality of data sections extracted from the selected program file associated with one of the plurality of older versions of the second application; and storing the calculated content entropy metrics as fields of the second program descriptor corresponding to one of the plurality of older versions of the second application.

19. A computer program product for determining whether a first application corresponds to a new version of a second application, the computer program product being embodied in a tangible computer readable storage medium and comprising computer instructions for:

selecting a program file associated with the first application; and     calculating a hash of the selected program file, and in response to determining that the hash of the selected program file does not match with a plurality of hashes, each being a hash of a corresponding program file associated with one of a plurality of older versions of the second application:

determining a first program descriptor corresponding to the first application, wherein the first program descriptor comprises metadata fields extracted from the selected program file associated with the first application, and wherein the first program descriptor comprises a plurality of data sections extracted from the selected program file associated with the first application; and         determining that the first application corresponds to a new version of the second application based on a determination that the first program descriptor is similar to a second program descriptor corresponding to one of the plurality of older versions of the second application, wherein determining similarity of the two program descriptors comprises:

determining that the metadata fields of the first program descriptor are similar to the corresponding metadata fields of the second program descriptor;

computing a content similarity entropy metric between each data section in the first program descriptor and its corresponding data section in the second program descriptor; and             determining that each data section in the first program descriptor is similar to its corresponding data section in the second program descriptor based on the computed content similarity entropy metrics.

20. A method of determining whether a first application corresponds to a new version of a second application, comprising:

identifying a second application having a blacklist policy;

selecting a program file associated with the first application; and     calculating a hash of the selected program file, and in response to determining that the hash of the selected program file does not match with a plurality of hashes, each being a hash of a corresponding program file associated with one of a plurality of older versions of the second application:

determining a first program descriptor corresponding to the first application, wherein the first program descriptor comprises metadata fields extracted from the selected program file associated with the first application, and wherein the first program descriptor comprises a plurality of data sections extracted from the selected program file associated with the first application; and         determining that the first application corresponds to a new version of the second application based on a determination that the first program descriptor is similar to a second program descriptor corresponding to one of the plurality of older versions of the second application, wherein determining similarity of the two program descriptors comprises:

determining that the metadata fields of the first program descriptor are similar to the corresponding metadata fields of the second program descriptor;

computing a content similarity entropy metric between each data section in the first program descriptor and its corresponding data section in the second program descriptor; and             determining that each data section in the first program descriptor is similar to its corresponding data section in the second program descriptor based on the computed content similarity entropy metrics.

21. A system for determining whether a first application corresponds to a new version of a second application, comprising:

a processor; and a memory coupled with the processor, wherein the memory is configured to provide the processor with instructions which when executed cause the processor to:

identify a second application having a blacklist policy;

select a program file associated with the first application; and     calculate a hash of the selected program file, and in response to determining that the hash of the selected program file does not match with a plurality of hashes, each being a hash of a corresponding program file associated with one of a plurality of older versions of the second application:

determine a first program descriptor corresponding to the first application, wherein the first program descriptor comprises metadata fields extracted from the selected program file associated with the first application, and wherein the first program descriptor comprises a plurality of data sections extracted from the selected program file associated with the first application; and     determine that the first application corresponds to a new version of the second application based on a determination that the first program descriptor is similar to a second program descriptor corresponding to one of the plurality of older versions of the second application, wherein determining similarity of the two program descriptors comprises:

determining that the metadata fields of the first program descriptor are similar to the corresponding metadata fields of the second program descriptor;

computing a content similarity entropy metric between each data section in the first program descriptor and its corresponding data section in the second program descriptor; and         determining that each data section in the first program descriptor is similar to its corresponding data section in the second program descriptor based on the computed content similarity entropy metrics.

\* \* \* \* \*

UNITED STATES PATENT AND TRADEMARK OFFICE
CERTIFICATE OF CORRECTION

PATENT NO. : 10,853,058 B1
APPLICATION NO. : 16/370453
DATED : December 1, 2020
INVENTOR(S) : Freddy Ouzan et al.

Page 1 of 1

It is certified that error appears in the above-identified patent and that said Letters Patent is hereby corrected as shown below:

In the Specification

In Column 3, Line(s) 46, delete "(Mach-0)" and insert --(Mach-O)--, therefor.
In Column 4, Line(s) 45, after "application", delete "version-4.10.2 (304)" and insert -- -version 4.10.2 (304)--, therefor.

In the Claims

In Column 11, Line(s) 63, Claim 5, before "one", delete "each of the one or more".
In Column 12, Line(s) 21 & 22, Claim 6, after "application", delete "or more sections of the program files".

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*